(12) United States Patent
Liu et al.

(10) Patent No.: US 11,865,684 B2
(45) Date of Patent: Jan. 9, 2024

(54) PNEUMATIC ELECTRIC NAIL GUN

(71) Applicant: BASSO INDUSTRY CORP., Taichung (TW)

(72) Inventors: An-Gi Liu, Taichung (TW); Chang-Sheng Lin, Taichung (TW); Fu-Ying Huang, Taichung (TW)

(73) Assignee: Basso Industry Corp., Taichung (TW)

( * ) Notice: Subject to any disclaimer, the term of this patent is extended or adjusted under 35 U.S.C. 154(b) by 12 days.

(21) Appl. No.: 17/166,025

(22) Filed: Feb. 3, 2021

(65) Prior Publication Data

US 2021/0245344 A1 Aug. 12, 2021

(30) Foreign Application Priority Data

Feb. 6, 2020 (TW) .................................. 109103698

(51) Int. Cl.
*B25C 1/04* (2006.01)
*B25C 1/06* (2006.01)
*F16F 15/08* (2006.01)

(52) U.S. Cl.
CPC .............. *B25C 1/041* (2013.01); *B25C 1/047* (2013.01); *B25C 1/06* (2013.01); *F16F 15/08* (2013.01)

(58) Field of Classification Search
CPC ........ F16F 15/08; F16F 1/3732; F16F 1/3735; B23Q 11/0032; B25F 5/006; B25C 1/04; B25C 1/041; B25C 1/047; B25C 1/06
See application file for complete search history.

(56) References Cited

U.S. PATENT DOCUMENTS

| 3,053,046 | A | * | 9/1962 | Fleming, Jr. | ........ F16B 19/1081 |
| | | | | | 29/450 |
| 3,350,042 | A | * | 10/1967 | Stewart | ................. F16F 1/3732 |
| | | | | | 267/141.4 |
| 3,532,319 | A | * | 10/1970 | Brown | .................. F16F 1/3732 |
| | | | | | 267/141.4 |

(Continued)

FOREIGN PATENT DOCUMENTS

| CN | 107249823 A | 10/2017 |
| CN | 108068059 A | 5/2018 |

(Continued)

OTHER PUBLICATIONS

Search Report issued to European counterpart application No. 21154531.4 by the EPO dated Jun. 11, 2021.

(Continued)

*Primary Examiner* — Joshua G Kotis
(74) *Attorney, Agent, or Firm* — Burris Law, PLLC (57) ABSTRACT

A pneumatic electric nail gun includes a muzzle unit, a striking cylinder that is connected to the muzzle unit, a piston rod subunit that extends movably from the striking cylinder into the muzzle unit, an electric unit that drives movement of the piston rod subunit from a standby position to a nail-striking position for striking a nail, and a connecting unit that includes a plurality of fasteners and a plurality of buffer members. The fasteners extend through the electric unit and secure the electric unit to the muzzle unit. Each of the buffer members surrounds a respective one of the fasteners and fills a space between the respective one of the fasteners, the electric unit and the muzzle unit for shock absorption during a nail-striking process.

7 Claims, 9 Drawing Sheets

(56) References Cited

U.S. PATENT DOCUMENTS

| | | | | |
|---|---|---|---|---|
| 4,067,531 | A * | 1/1978 | Sikula | F02B 77/13 277/916 |
| 4,358,098 | A * | 11/1982 | Ceseri | F16B 5/0258 267/141.5 |
| 4,425,813 | A * | 1/1984 | Wadensten | F16F 15/124 310/91 |
| 5,094,579 | A * | 3/1992 | Johnson | F16B 35/041 411/970 |
| 5,277,554 | A * | 1/1994 | Elson | F04B 39/00 417/363 |
| 5,348,267 | A * | 9/1994 | Lanting | F16F 15/08 267/293 |
| 5,397,206 | A * | 3/1995 | Sihon | F16F 7/00 411/970 |
| 5,692,306 | A * | 12/1997 | Stoll | B25F 5/006 173/162.1 |
| 5,975,862 | A * | 11/1999 | Arahata | B25F 5/006 417/234 |
| 6,227,784 | B1 * | 5/2001 | Antoine | F16B 5/0258 411/353 |
| 8,474,804 | B2 * | 7/2013 | Masterson | G11B 33/08 267/141 |
| 2004/0113339 | A1 * | 6/2004 | Masterson | F16F 1/3732 267/153 |
| 2005/0179180 | A1 * | 8/2005 | Saito | F16F 15/08 267/293 |
| 2005/0206058 | A1 * | 9/2005 | Masterson | F16F 1/3732 267/293 |
| 2006/0076722 | A1 * | 4/2006 | Huang | F16F 15/08 267/293 |
| 2010/0039766 | A1 * | 2/2010 | Chiang | G11B 33/08 267/141 |
| 2010/0237127 | A1 * | 9/2010 | Wu | B25C 1/08 227/10 |
| 2014/0374461 | A1 | 12/2014 | Pedicini et al. | |
| 2015/0295472 | A1 * | 10/2015 | Kuraishi | H02K 9/04 267/141 |
| 2018/0036870 | A1 * | 2/2018 | Komazaki | B25C 1/047 |
| 2018/0126528 | A1 * | 5/2018 | Pomeroy | B25C 1/008 |
| 2019/0120870 | A1 * | 4/2019 | Cvach | F16F 15/08 |
| 2019/0126453 | A1 | 5/2019 | Po | |
| 2021/0299836 | A1 * | 9/2021 | Baba | B25C 1/047 |
| 2021/0324932 | A1 * | 10/2021 | Vippach | F16F 1/376 |

FOREIGN PATENT DOCUMENTS

| | | |
|---|---|---|
| JP | 2019141938 A | 8/2019 |
| TW | 201034808 A | 10/2010 |
| WO | WO2018100943 A1 | 6/2018 |

OTHER PUBLICATIONS

Search Report appended to an Office Action, which was issued to Taiwanese counterpart application No. 109103698 by the TIPO dated Jun. 27, 2023 with an English translation thereof.

\* cited by examiner

PNEUMATIC ELECTRIC NAIL GUN

CROSS-REFERENCE TO RELATED APPLICATION

This application claims priority of Taiwanese Patent Application No. 109103698, filed on Feb. 6, 2020.

FIELD

The disclosure relates to a nail gun, and more particularly to a pneumatic electric nail gun.

BACKGROUND

Figure 1:
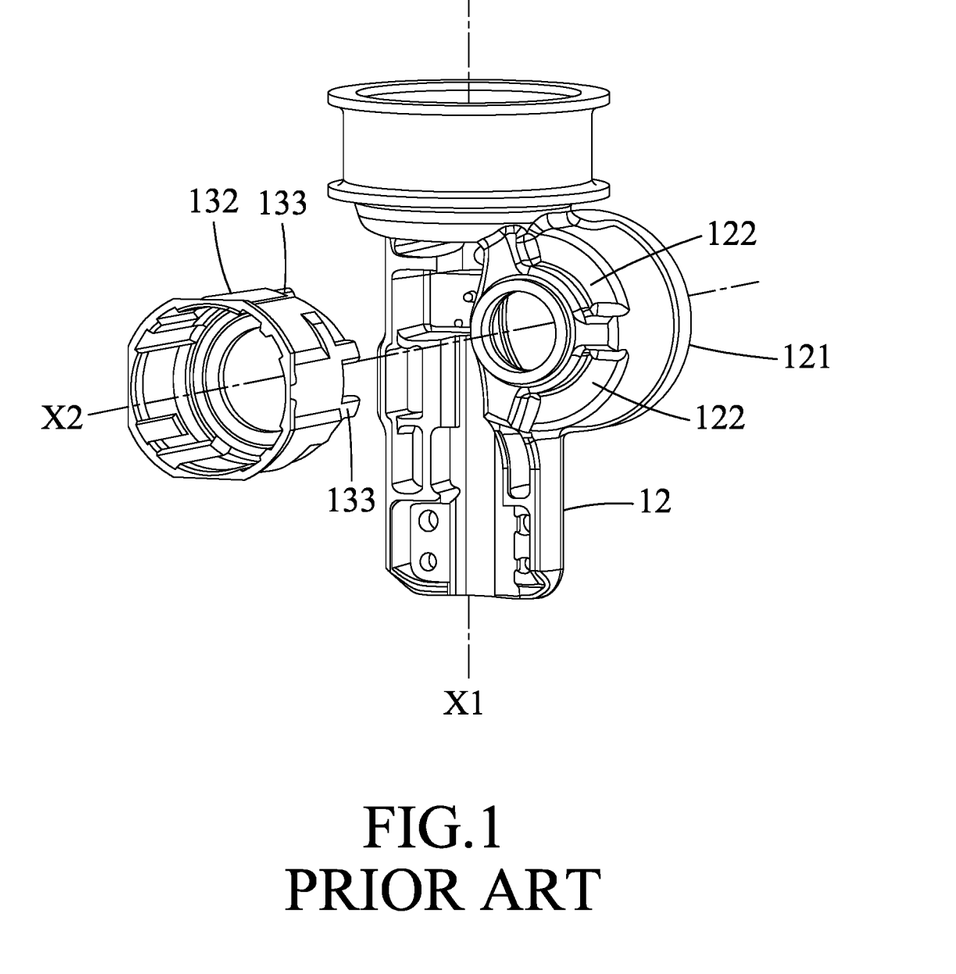
FIG. 1 is a fragmentary exploded perspective view of a conventional electric nail gun disclosed in Japanese Patent Publication No. WO2018-100943.
Figure 2:
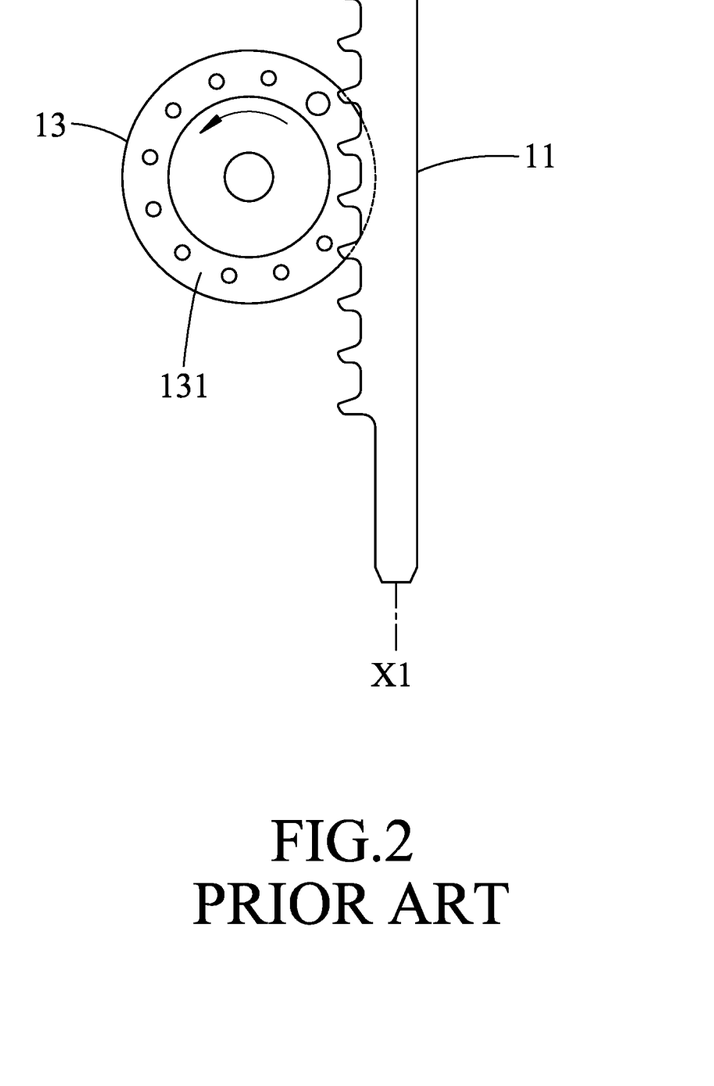
FIG. 2 is a fragmentary schematic view of the conventional electric nail gun.

Referring to FIGS. 1 and 2, a conventional pneumatic electric nail gun disclosed in Japanese Patent Publication No. WO2018-100943 is powered by pneumatic and electric powers. The pneumatic electric nail gun includes a striking member 11, a casing 12 and a speed reduction unit 13.

The striking member 11 is mounted to the casing 12, and is movable along a first axis (X1). The casing 12 has a surrounding portion 121 that surrounds a second axis (X2) skew to the first axis (X1), and that has a plurality of first coupling segments 122 formed on an outer surface thereof and arranged around the second axis (X2). The speed reduction unit 13 is mounted to the casing 12, and includes a lifting wheel 131 and a connecting portion 132. The lifting wheel 131 is rotatably disposed in the surrounding portion 121 of the casing 12 and is engaged with the striking member 11. The connecting portion 132 surrounds the second axis (X2), houses a reduction gear set (not shown) that drives rotation of the lifting wheel 131, and has a plurality of second coupling segments 133 that are formed on an outer surface thereof, that are arranged around the second axis (X2), and that are engaged with the first coupling segments 122 of the casing 12 such that the speed reduction unit 13 is coupled to the casing 12. The first and second coupling segments 122, 133 are complementary in shape.

When the reduction gear set is rotated by a motor (not shown), the lifting wheel 131 is driven by the reduction gear set to move the striking member 11 along the first axis (X1) to initiate a nail-striking process. When the striking member 11 strikes a nail (not shown), a recoil shock is transmitted to the surrounding portion 121 of the casing 12 and the connecting portion 132 of the speed reduction unit 13, resulting in a torque exerting in a circumferential direction of the second axis (X2).

By virtue of the first and second coupling segments 122, 133 being arranged around the second axis (X2), the torque is dispersed therethrough, thereby avoiding stress concentration and damage to the surrounding portion 121 and the connecting portion 132. However, the recoil shock transmitted throughout the speed reduction unit 13 can still cause damage to the reduction gear set disposed therein.

SUMMARY

Therefore, the object of the disclosure is to provide a pneumatic electric nail gun that can alleviate the drawback of the prior art.

According to the disclosure, a pneumatic electric nail gun includes a muzzle unit, a cylinder unit, an electric unit and a connecting unit. The muzzle unit surrounds a striking axis and is adapted for loading a nail. The cylinder unit includes a striking cylinder and a piston rod subunit. The striking cylinder has a first end that is connected to the muzzle unit, and a second end that is distal from the muzzle unit along the striking axis. The piston rod subunit extends from the striking cylinder into the muzzle unit, and is movable relative to the striking cylinder along the striking axis by an air pressure in a space between the piston rod subunit and the second end of the striking cylinder from a standby position, where the piston rod subunit is proximate to the second end of the striking cylinder, to a nail-striking position, where the piston rod subunit is distal from the second end of the striking cylinder and where the piston rod subunit is adapted to strike the nail. The electric unit is connected to the muzzle unit for driving movement of the piston rod subunit from the nail-striking position to the standby position, and simultaneously increasing the air pressure in the space between the piston rod subunit and the second end of the striking cylinder. The connecting unit includes a plurality of fasteners and a plurality of buffer members. The fasteners extend through the electric unit and secure the electric unit to the muzzle unit. Each of the buffer members surrounds a respective one of the fasteners and fills a space between the respective one of the fasteners, the electric unit and the muzzle unit for shock absorption.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
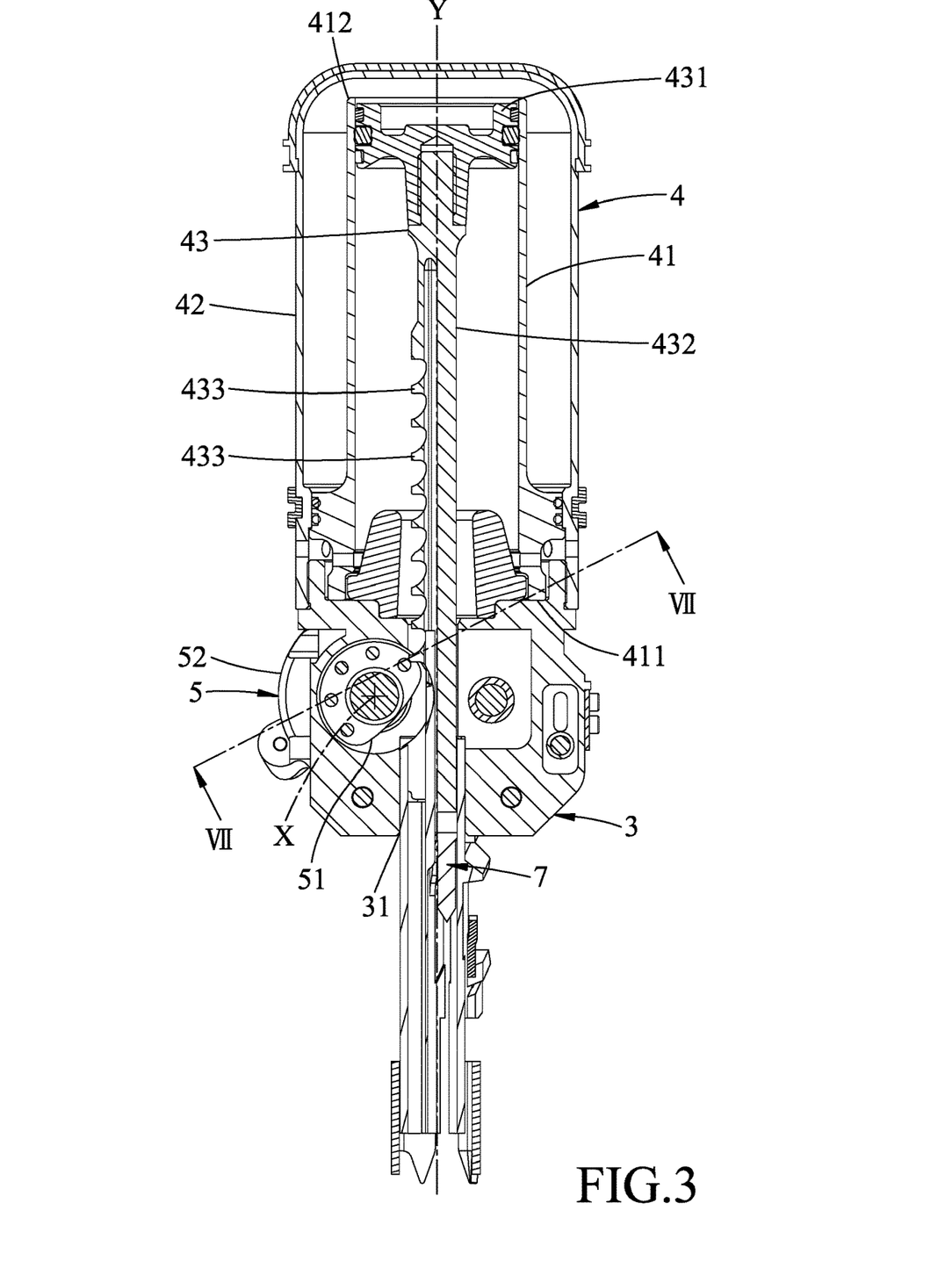
FIG. 3 is a sectional view of an embodiment of a pneumatic electric nail gun according to the disclosure, illustrating a piston rod subunit at a standby position.
Figure 4:
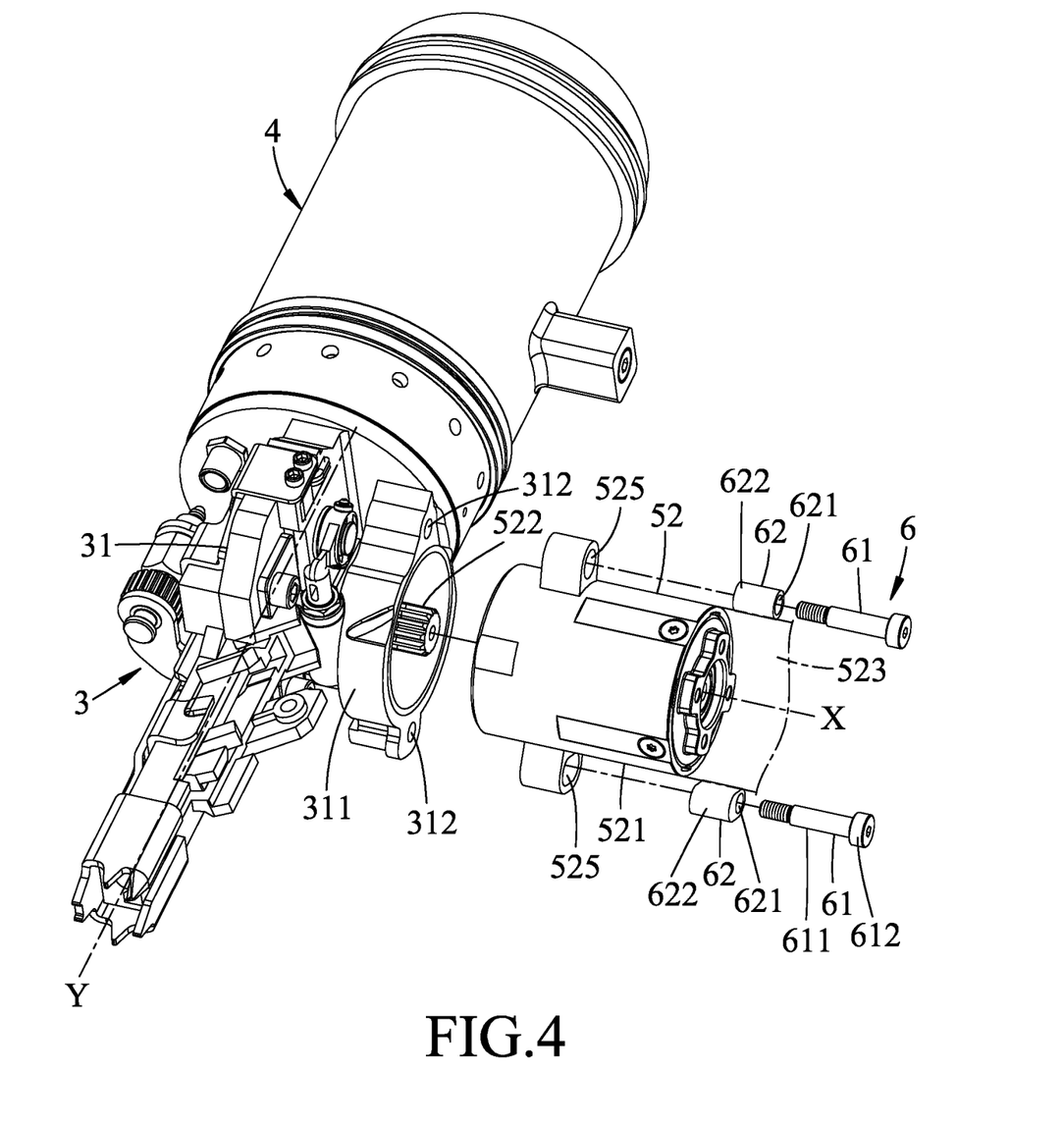
FIG. 4 is a fragmentary partly exploded perspective view of the embodiment.
Figure 5:
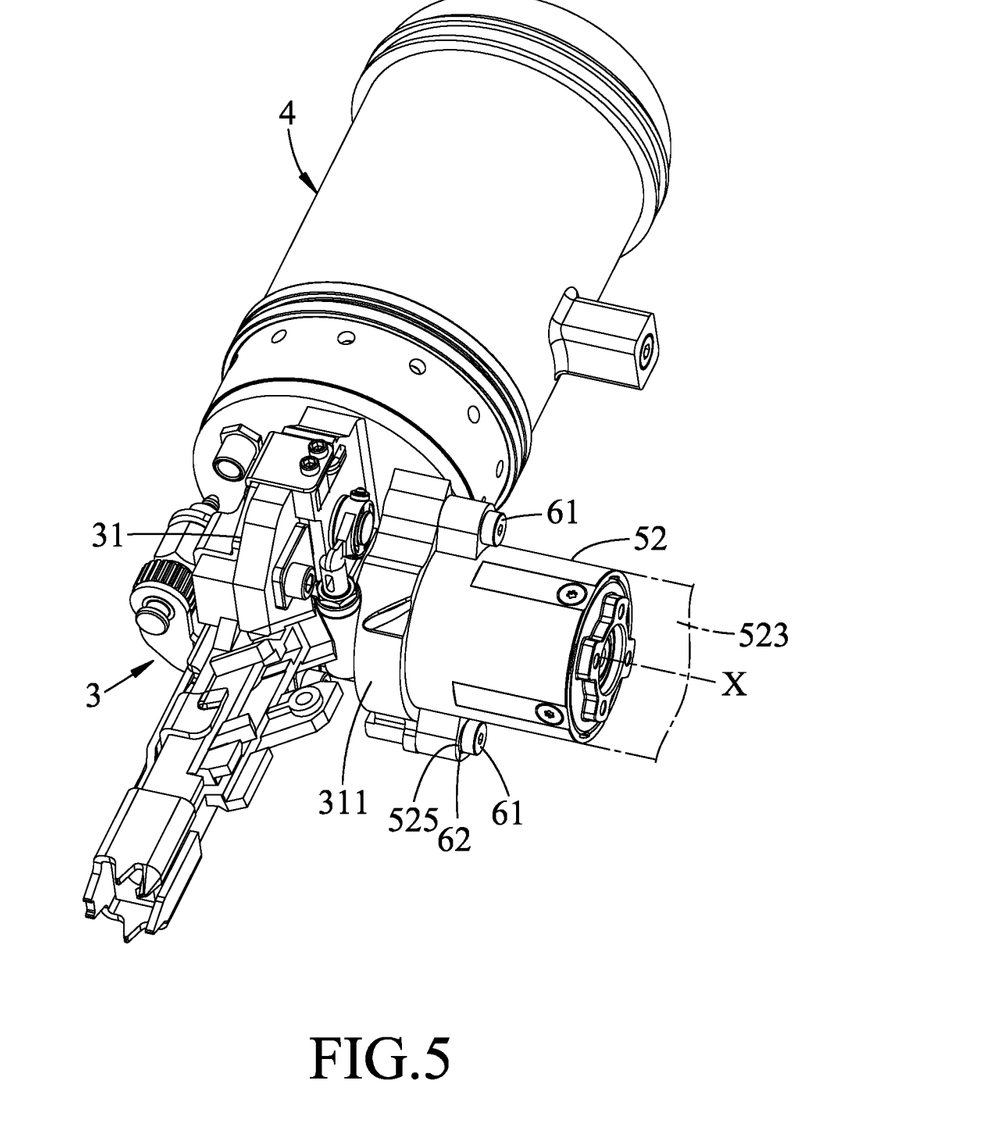
FIG. 5 is a fragmentary assembled perspective view of the embodiment.

Referring to FIGS. 3, 4 and 5, a pneumatic electric nail gun according to the disclosure includes a muzzle unit 3, a cylinder unit 4, an electric unit 5 and a connecting unit 6.

The muzzle unit 3 includes a muzzle seat 31 that surrounds a striking axis (Y) and that is adapted for loading a nail 7. The muzzle seat 31 has a surrounding body 311 that surrounds a rotary axis (X) skew to the striking axis (Y), and that is formed with two screw holes 312 extending in a direction of the rotary axis (X).

The cylinder unit 4 includes a striking cylinder 41, a storage cylinder 42 and a piston rod subunit 43.

The striking cylinder 41 has a first end 411 that is connected to the muzzle unit 3, and a second end 412 that is distal from the muzzle unit 3 along the striking axis (Y).

The storage cylinder 42 surrounds and is spatially communicated with the striking cylinder 41, and is adapted for storing pressurized air and providing the same to the striking cylinder 41.

Figure 6:
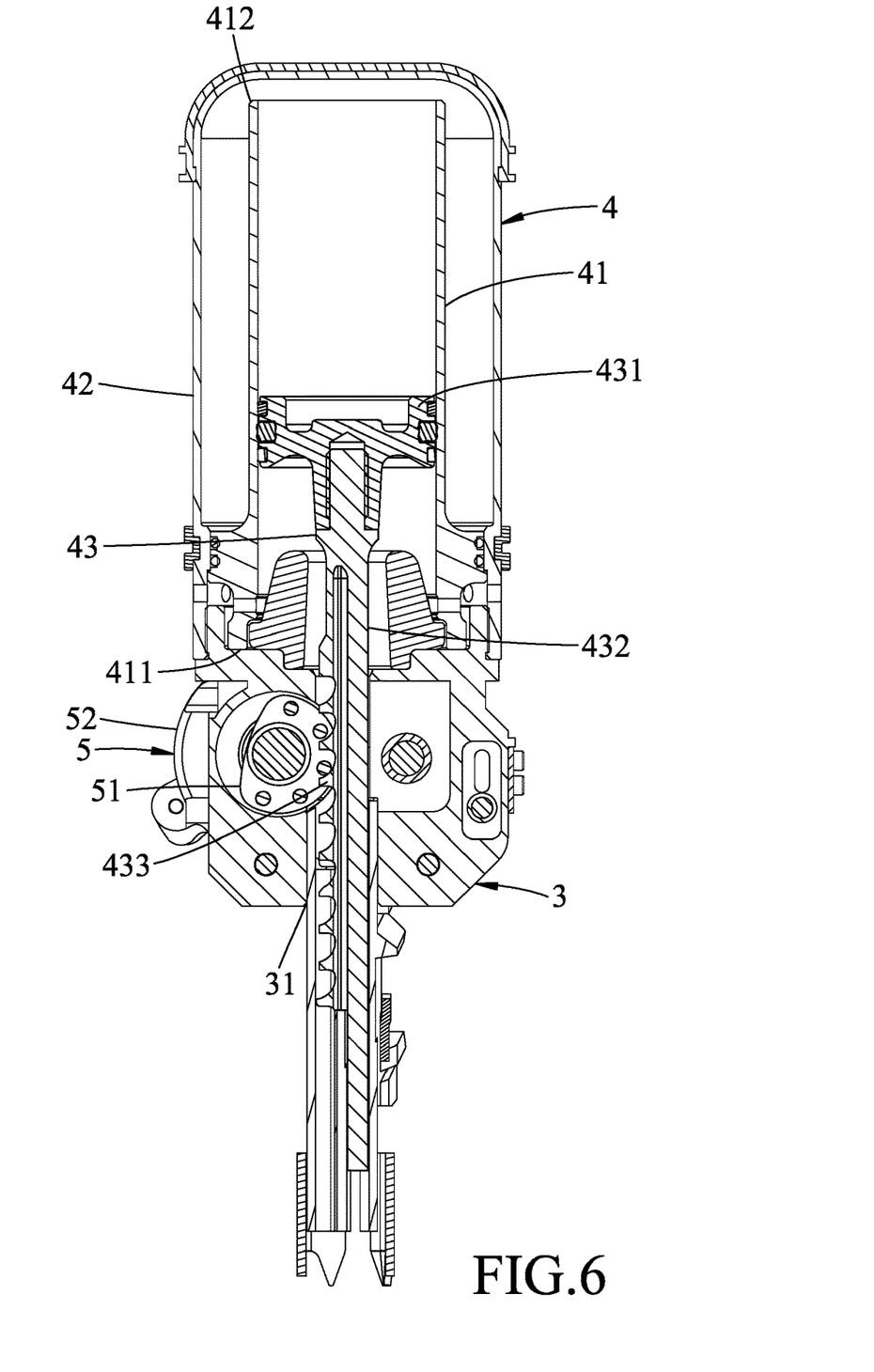
FIG. 6 is another sectional view of the embodiment, illustrating the piston rod subunit at a nail-striking position.

The piston rod subunit 43 extends from the striking cylinder 41 into the muzzle unit 3, and is movable relative to the striking cylinder 41 along the striking axis (Y) between a standby position (see FIG. 3) and a nail-striking position (see FIG. 6).

Specifically, the piston rod subunit 43 includes a piston 431 and a nail-striking member 432. The piston 431 extends along the striking axis (Y), and is movably disposed in the striking cylinder 41. The nail-striking member 432 extends along the striking axis (Y), is co-movably connected to the piston 431, and has a plurality of spaced-apart engaging teeth 433 arranged along the striking axis (Y). When driven by an air pressure in a space between the piston rod subunit 43 and the second end 412 of the striking cylinder 41, the piston rod subunit 43 moves from the standby position to the nail-striking position.

More specifically, when at the standby position, the piston rod subunit 43 is proximate to the second end 412 of the striking cylinder 41, and the space between the piston rod subunit 43 and the second end 412 of the striking cylinder 41 has a minimum volume. When at the nail-striking position, the piston rod subunit 43 is distal from the second end 412 of the striking cylinder 41, the space between the piston rod subunit 43 and the second end 412 of the striking cylinder 41 has a maximum volume, and the piston rod subunit 43 is adapted to strike the nail 7.

It should be noted that, in the present embodiment, the engaging teeth 433 are formed on the nail-striking member 432, but are not limited thereto. In variations of the embodiment, the piston rod subunit 43 may further include a lifting rod that is parallel to the nail-striking member 432, and that is formed with the engaging teeth 433.

The electric unit 5 is connected to the muzzle unit 3 for driving movement of the piston rod subunit 43 from the nail-striking position to the standby position, and simultaneously increasing the air pressure in the space between the piston rod subunit 43 and the second end 412 of the striking cylinder 41.

The electric unit 5 includes a lifting gear 51 and a speed reduction subunit 52.

The lifting gear 51 is mounted in the muzzle seat 31 of the muzzle unit 3, is rotatable about the rotary axis (X), and is detachably engaged with the engaging teeth 433 of the nail-striking member 432 such that rotation of the lifting gear 51 drives the movement of the piston rod subunit 43 along the striking axis (Y) toward the standby position.

The speed reduction subunit 52 is fastened to the muzzle unit 3 by the fasteners 61, and is engaged with the lifting gear 51 for driving the rotation thereof. The speed reduction subunit 52 includes a casing 521, a rotary shaft 522, a motor 523, and a reduction gear set 524 (see FIGS. 7 and 9).

Figure 7:
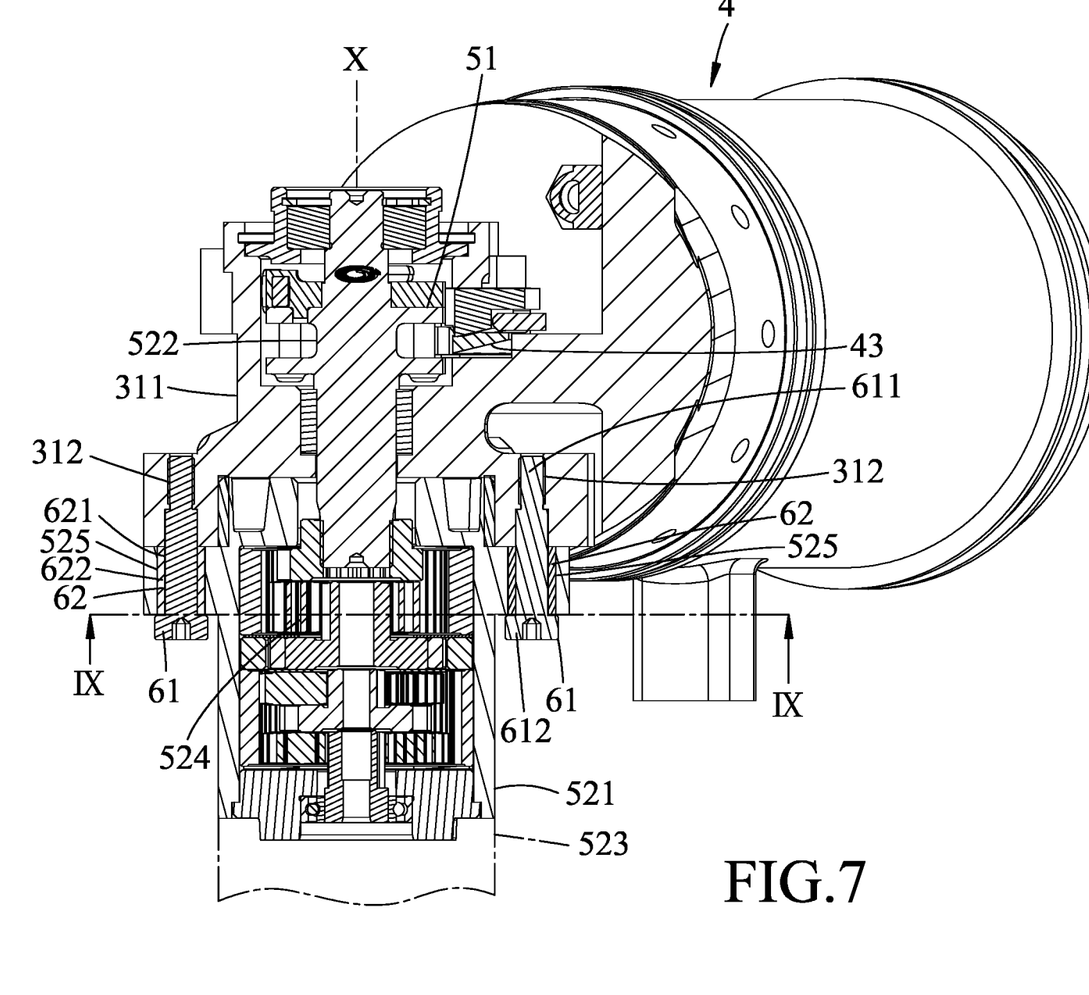
FIG. 7 is a sectional view taken along line VII-VII in FIG. 3.
Figure 9:
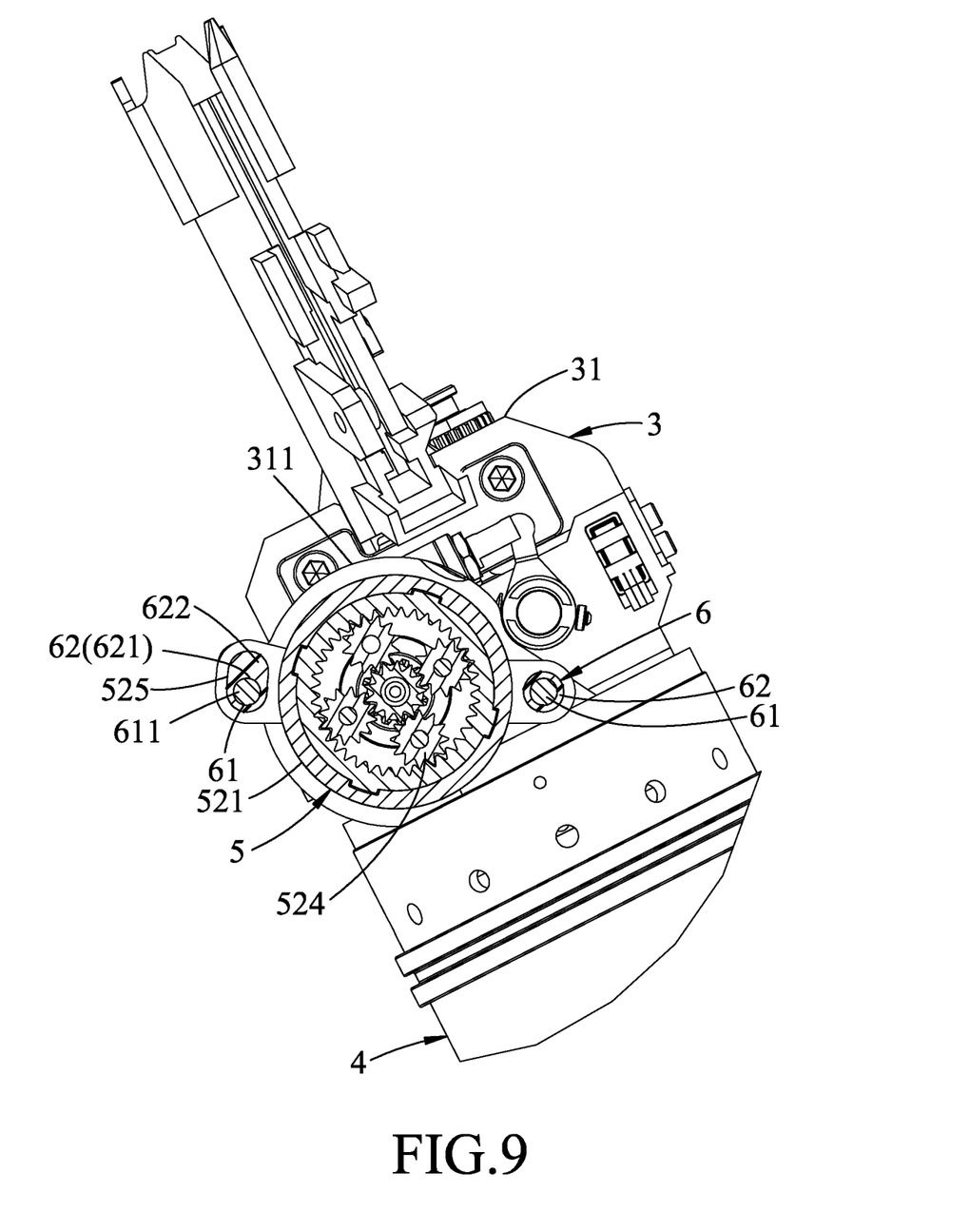
FIG. 9 is a sectional view taken along line IX-IX in FIG. 7.

The casing 521 is connected to the surrounding body 311 of the muzzle unit 3, extends along the rotary axis (X), and is formed with a plurality of through holes 525 (i.e., two through holes 525 in the present embodiment) that extend in the direction of the rotary axis (X) and that are registered respectively with the screw holes 312 of the surrounding body 311 of the muzzle unit 3. The rotary shaft 522 extends along the rotary axis (X) in the muzzle surrounding body 311 of the muzzle unit 3, and is connected coaxially and co-rotatably to the lifting gear 51. The reduction gear set 524 is movably mounted in the casing 521, and is engaged with the rotary shaft 522. The motor 523 is mounted to the casing 521, and is connected to the reduction gear set 524 such that the reduction gear set 524 transmit an output power of the motor 523 to the rotary shaft 522 to thereby drive the rotation of the lifting gear 51.

Figure 8:
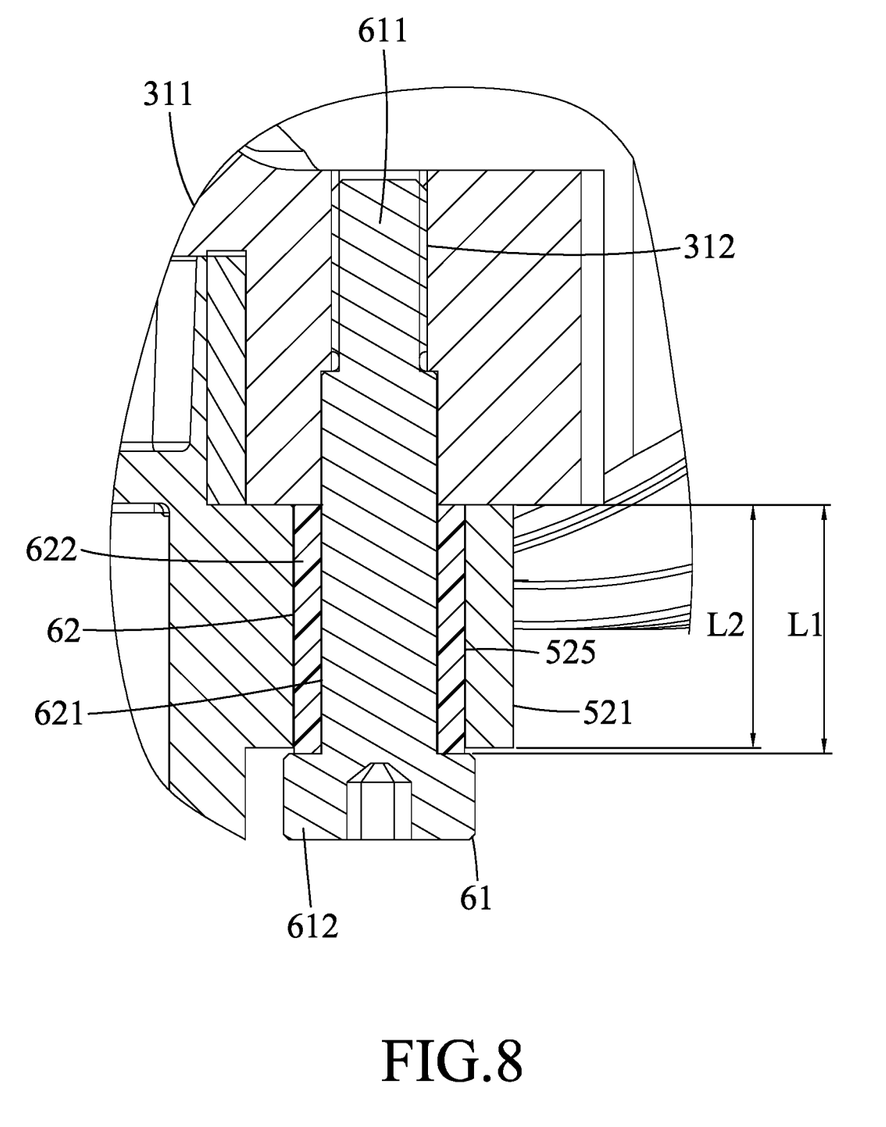
FIG. 8 is an enlarged view of part of FIG. 7.

Referring to FIGS. 4, 7 and 8, the connecting unit 6 includes a plurality of fasteners 61 that secure the electric unit 5 to the muzzle unit 3, and a plurality of buffer members 62 that surround respectively the fasteners 61. In the present embodiment, there are, but not limited to, two fasteners 61 and two buffer members 62.

Each of the fasteners 61 has a rod portion 611 and a head portion 612. The rod portion 611 of each of the fasteners 61 extends through a respective one of the through holes 525 of the casing 521 in the direction of the rotary axis (X), and is threadedly engaged with a respective one of the screw holes 312 of the muzzle unit 3 to fasten the speed reduction subunit 52 to the muzzle unit 3. The head portion 612 of each of the fasteners 61 is connected to an end of the rod portion 611 that is distal from the respective one of the screw holes 312.

The buffer members 62 are made of a flexible material that includes one of silicon rubber, plastic and silica gel. Each of the buffer members 62 is received in a respective one of the through holes 525 of the casing 521, and has a main body 622 formed with a receiving hole 621. For each of the buffer members 62, the main body 622 is in contact with the muzzle unit 3 and the casing 521, surrounds the rod portion 611 of a respective one of the fasteners 61 and abuts against the head portion 612 of the respective one of the fasteners 61, and the receiving hole 621 fittingly receives the rod portion 611 such that the main body 622 fills a space between the respective one of the fasteners 61, the electric unit 5 and the muzzle unit 3 for shock absorption.

Referring to FIG. 8, it should be noted that each of the buffer members 62 has a length (L1) in the direction of the rotary axis (X) greater than a length (L2) of the respectively one of the through holes 525. It should also be noted that, a contour of a cross section of the main body 622 of one of the buffer members 62 (see FIGS. 4 and 9) perpendicular to the direction of the rotary axis (X) is an ellipse, and the receiving hole 621 thereof is eccentric with respect to the cross section of the main body 622. However, in variations of the embodiment, the contour of the cross section of the main body 622 may be, but not limited to, one of a circle and a rectangle, and each of the through holes 525 is of the same shape accordingly.

Referring to FIGS. 3 and 6, during operation, the motor 523 drives the reduction gear set 524 to rotate, thereby driving the co-rotation of the rotary shaft 522 and the lifting gear 51 in the counterclockwise direction (as seen from the perspective of the viewer). At the same time, the engagement between the lifting gear 51 and the engaging teeth 433 of the nail-striking member 432 drives the piston rod subunit 43 to move toward the standby position. During this process, the air stored in the striking cylinder 41 is pressurized by the piston 431 and is stored in the storage cylinder 42.

As the lifting gear 51 keeps rotating, it becomes disengaged from the engaging teeth 433, and the pressurized air in the striking cylinder 41 and the storage cylinder 42 is allowed to push the piston rod subunit 43 toward the nail-striking position. At the very moment the nail-striking member 432 strikes the nail 7, a recoil shock is transmitted from the muzzle unit 3 to the connecting unit 6 and is dampened and absorbed by the buffer members 62 of the connecting unit 6.

It should be noted that in virtue of the length (L1) of each of the buffer members 62 being greater than the length (L2)

of the respective one of the through holes 525, the buffer members 62 are able to not only absorb the shock exerted in a circumferential direction of the fasteners 61, but allows the casing 521 of the electric unit 5 to move slightly along the rotary axis (X) which prevents the recoil shock from damaging components of the electric unit 5.

In summary, the embodiment of the pneumatic electric nail gun according to the disclosure has the following advantages.

By virtue of disposition of the connecting unit 6, the recoil shock generated during operation is dampened by the buffer members 62 before being transmitted to the electric unit 5, and the casing 521 of the electric unit 5 is allowed to move slightly to further dampen the recoil shock, thereby protecting the lifting gear 51 and the reduction gear set 524 and lengthening the lifespans thereof.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A pneumatic electric nail gun comprising:
   a muzzle unit that surrounds a striking axis and that is adapted for loading a nail;
   a cylinder unit that includes
      a striking cylinder having a first end that is connected to said muzzle unit, and a second end that is opposite to said first end along the striking axis, and
      a piston rod subunit extending from said striking cylinder into said muzzle unit, and movable relative to said striking cylinder along the striking axis by an air pressure in a space between said piston rod subunit and said second end of said striking cylinder from a standby position, where a top end of said piston rod subunit is adjacent to said second end of said striking cylinder, to a nail-striking position, where said top end of said piston rod subunit is moved away from said second end of said striking cylinder and where said piston rod subunit is adapted to strike the nail;
   an electric unit that is connected to said muzzle unit for driving movement of said piston rod subunit from the nail-striking position to the standby position, and simultaneously increasing the air pressure in said space between said piston rod subunit and said second end of said striking cylinder; and
   a connecting unit that includes
      a plurality of fasteners extending through said electric unit and securing said electric unit to said muzzle unit, and
      a plurality of buffer members, each of said buffer members being made of a flexible material, surrounding a respective one of said fasteners, being in direct contact with the respective one of said fasteners, said electric unit and said muzzle unit, and directly filling a space delimited by said respective one of said fasteners, said electric unit and said muzzle unit for shock absorption;
   wherein said electric unit includes a speed reduction subunit that is formed with a plurality of through holes extending in a direction of a rotary axis which is skew to the striking axis; and
   wherein each of said buffer members is received in a respective one of said through holes, has a first end that is in direct contact with said muzzle unit and that is disposed within the respective one of said through holes, and a second end that is in direct contact with a head of the respective one of said fasteners and that extends out of the respective one of said through holes, and having a length in a direction of the rotary axis that is greater than a length of the respective one of said through holes.

2. The pneumatic electric nail gun in claim 1, wherein:
   said piston rod subunit has a plurality of spaced-apart engaging teeth;
   said electric unit further includes
      a lifting gear that is rotatably mounted in said muzzle unit and that is detachably engaged with said engaging teeth such that rotation of said lifting gear drives the movement of said piston rod subunit along the striking axis toward the standby position; and
      said speed reduction subunit that is fastened to said muzzle unit by said fasteners, and is engaged with said lifting gear for driving the rotation thereof.

3. The pneumatic electric nail gun in claim 2, wherein:
   said lifting gear is rotatable about the rotary axis; and
   said speed reduction subunit includes
      a casing connected to said muzzle unit, each of said fasteners extending through said casing in the direction of the rotary axis and fastening said speed reduction subunit to said muzzle unit,
      a reduction gear set movably mounted in said casing,
      a rotary shaft extending along the rotary axis, connected coaxially to said lifting gear, and engaged with said reduction gear set, and
      a motor connected to said reduction gear set such that said reduction gear set transmit an output power of said motor to said rotary shaft to thereby driving the rotation of said lifting gear.

4. The pneumatic electric nail gun in claim 3, wherein:
   said muzzle unit is formed with a plurality of screw holes extending in the direction of the rotary axis;
   said casing of said speed reduction subunit is formed with said through holes registered respectively with said screw holes; and
   each of said fasteners has
      a rod portion extending through a respective one of said through holes, surrounded by the respective one of said buffer members, and threadedly engaged with a respective one of said screw holes, and a head portion connected to an end of said rod portion that is pointing away from the respective one of said screw holes, and abutting against the respective one of said buffer members.

5. The pneumatic electric nail gun in claim 4, wherein each of said buffer members has a main body that is formed with a receiving hole which fittingly receives said rod portion of the respective one of said fasteners, a contour of a cross section of said main body of each of said buffer members perpendicular to the direction of the rotary axis being one of a circle, an ellipse and a rectangle.

6. The pneumatic electric nail gun in claim 1, wherein said buffer members are made of the flexible material that includes one of silicon rubber, plastic and silica gel.

7. The pneumatic electric nail gun in claim 1, wherein:
when said piston rod subunit is at the nail-striking position, said space between said piston rod subunit and said second end of said striking cylinder has a maximum volume; and
when said piston rod subunit is at the standby position, said space between said piston rod subunit and said second end of said striking cylinder has a minimum volume.

* * * * *